United States Patent Office 3,333,472
Patented Aug. 1, 1967

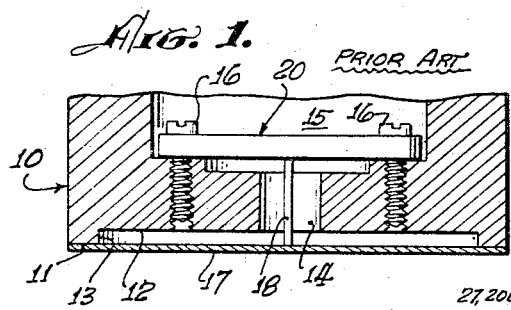
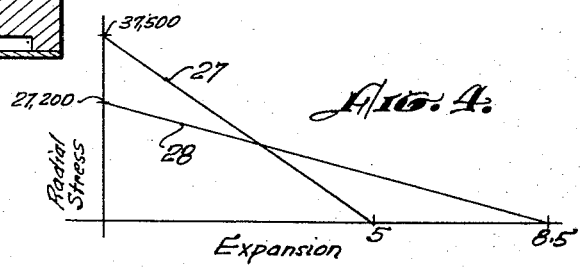
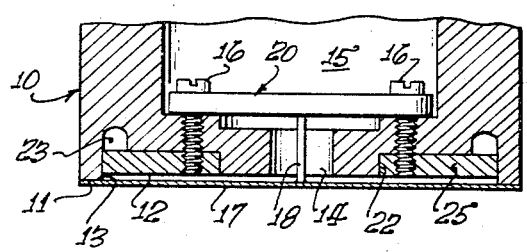
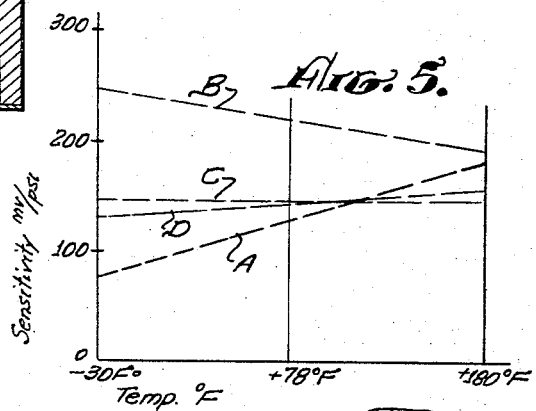
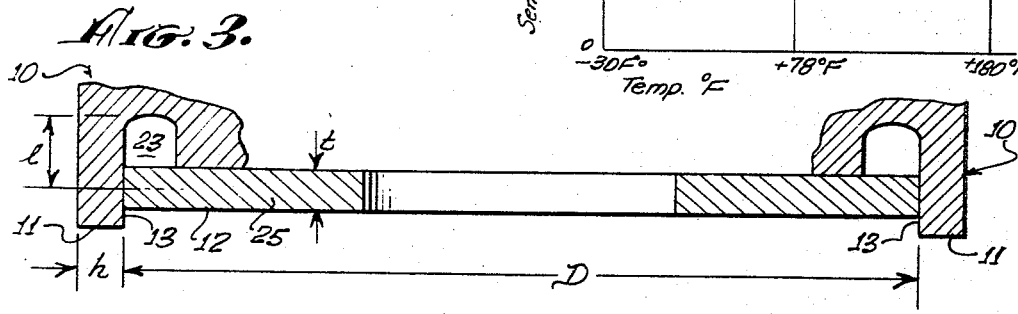
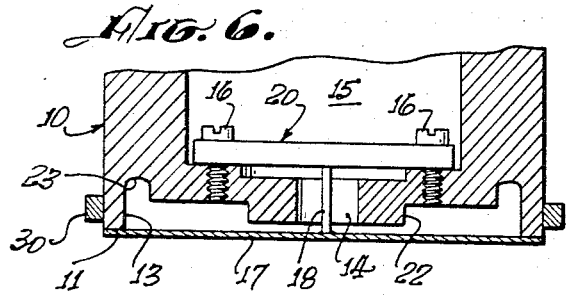

3,333,472
TEMPERATURE COMPENSATED TRANSDUCER
William H. McLelian, Pasadena, Calif., assignor to Electro-Optical Systems, Inc., Pasadena, Calif., a corporation of California
Filed Oct. 4, 1965, Ser. No. 492,605
8 Claims. (Cl. 73—393)

This invention relates to transducers and more particularly to temperature compensation techniques for pressure-responsive instruments of the diaphragm type.

In pressure transducers of the aforementioned type, the diaphragm is typically peripherally sealed in fluid-tight engagement across an opening in a casing or other mounting structure, one side of the diaphragm being exposed to the operative fluid. Many transducer embodiments of this type are characterized by an increase in sensitivity at elevated temperatures, this so-called "hot sensitivity" having a serious effect upon the accuracy of the instruments at low operating pressures and hence typically resulting in a significant restriction in operating temperature for instruments intended for use in the 0-1 p.s.i. range. It has been found that one cause of this "hot sensitivity" is thermal expansion of the instrument casing in the area surrounding the diaphragm occurring at a rate less than the thermal expansion of the diaphragm, thereby resulting in a decrease in diaphragm tension and the undesirable increase in pressure sensitivity.

Another significant reason for "hot sensitivity" is the natural decrease in Young's Modulus with increase in temperature for almost all materials. The result is that the system stiffness is lowered and therefore, a given pressure causes a greater diaphragm displacement at a higher temperature which results in a greater electrical output. Regardless of the cause or causes, if each is reasonably linear with temperature, then the system may be compensated by one single element. The present invention is directed toward obviating this "hot sensitivity" by providing a novel technique for increasing the diaphragm tension in a predetermined manner with increasing temperature.

The present invention technique is based upon the utilization of an expansion ring fabricated from a material having a predetermined thermal coefficient of expansion greater than that of the transducer casing, the expansion ring being mounted within the casing and adjacent the diaphragm. The peripheral surface of the expansion ring is fitted to the inner surface of the transducer casing, so that upon an increase in temperature the ring will expand and exert a radial stress on the contiguous portion of the instrument casing to provide a predetermined degree of counteraction to the "hot sensitivity" of the device.

As an alternative embodiment a compression ring fabricated from a material having a predetermined thermal coefficient of expansion smaller than that of the transducer casing may be utilized, the compression ring encircling the casing adjacent the diaphragm. Or, the compression ring may have a thermal coefficient of expansion greater than that of the transducer casing if the opposite type of compensation is required.

Accordingly, it is the object of the present invention to provide an improved temperature compensation technique for pressure-sensitive instruments of the diaphragm type.

It is another object of the present invention to provide improved pressure-responsive transducer structures.

It is also an object of the present invention to provide an improved technique for obviating the hot sensitivity of pressure transducers.

It is a further object of the present invention to provide improved pressure responsive transducer structures for operation at low pressures.

It is yet another object of the present invention to provide pressure transducer structures for operation at low pressures, characterized by higher permissible operating temperatures.

It is a still further object of the present invention to provide improved pressure-responsive transducers utilizing an expansion ring for temperature compensation.

It is also an object of the present invention to provide improved pressure-responsive instruments of the diaphragm type wherein diaphragm tension is adjusted in a predetermined manner upon variations in operating temperature.

It is yet a further object of the present invention to provide improved pressure-responsive instruments of the diaphragm type wherein the portion of the transducer casing adjacent the diaphragm is stressed radially outward in a predetermined manner upon increases in temperature.

The novel features which are believed to be characteristic of the invention, both as to its organization and method of operation, together with further objects and advantages thereof will be better understood from the following description considered in connection with the accompanying drawing, in which a presently preferred embodiment of the invention is illustrated by way of example. It is to be expressly understood, however, that the drawing is for the purpose of illustration and description only, and is not intended as a definition of the limits of the invention.

In the drawing:

FIGURE 1 is a partial elevation view, in section, of a typical prior part pressure transducer;

FIGURE 2 is a partial elevation view, in section, of a present invention pressure transducer;

FIGURE 3 is an enlarged sectional view of a portion of the transducer of FIGURE 2, labeled with dimensional symbols;

FIGURE 4 is a graph depicting radial stress plotted as a function of temperature expansion rate for different types of metal alloys used in the embodiment of FIGURES 2 and 3;

FIGURE 5 is a graph depicting typical output sensitivities plotted as a function of temperature for various alloys used in the transducer embodiment of FIGURES 2 and 3; and FIGURE 6 is a partial elevation view, in section, of an alternative pressure transducer embodiment.

Referring now to the drawing, the present invention technique will be described with reference to a presently preferred embodiment of a transducer structure of the type disclosed in my copending U.S. patent application Ser. No. 501,612 entitled "Low Pressure Transducer" filed Oct. 22, 1965, FIGURE 1 of the present drawing indicating this referenced type of transducer structure. In FIGURE 1 there is shown the lower portion of a transducer casing 10 of generally cylindrical tubular configuration. The lower end of the transducer casing 10 defines an annular end surface 11 encircling a central recessed portion defined by a transverse lower surface 12 and an axially extending inner wall surface 13. An axially extending passageway 14 connects the recessed portion with a central bore 15 of the transducer casing.

A thin, disc shaped diaphragm 17 is sealed in fluid-tight relationship with the annular end surface 11 of the transducer casing. A force rod 18 is secured at one of its ends to the center of the diaphragm 17 and extends through the passageway 14 into a chamber 15 where it is connected to a strain-electric translating device, generally indicated by the reference numeral 20. Such strain-electric translating devices are well known in the art and will not be discussed in detail. A particularly suitable type of strain-electric translating device is disclosed in my aforementioned co-pending patent application. The translating device 20 is secured within the chamber 15 by means of a plurality of screws 16 threaded into the transducer casing.

In operation, the lower exterior portion of the transducer casing is sealed off from atmospheric pressure and exposed to the operating fluid, the chamber 15 of the transducer casing being at atmospheric pressure. Bowing of the diaphragm 17 in accordance with the difference between the fluid pressure of the operative fluid and atmospheric pressure causes movement of the force rod 18, thereby resulting in a change in the electrical output of the transducer.

The present invention technique will be explained with reference to the type of transducer structure illustrated in FIGURE 1, wherein the diaphragm is mechanically coupled to means for translating diaphragm position into an indication of pressure. However, it is to be understood that the present invention technique is equally applicable to transducer structures wherein diaphragm coupling is by other than mechanical means. For example, electrical coupling could be used, movement of the diaphragm in a magnetic field causing changes in magnetic circuit reluctance.

In FIGURE 2 of the drawing, there is shown a presently preferred embodiment wherein the present invention concepts are applied to the type of tarnsducer structure illustrated in FIGURE 1, like reference numerals referring to identical parts throughout. An annular recess is created in the transverse lower surface 12, and extending from the inner wall surface 13 to an axially extending, annular wall surface 22, for accommodation of an expansion ring 25. In addition, an annular relief groove 23 is provided with its outermost diameter coincident with the inner wall surface 13. The expansion ring 25 is provided with suitable tapped holes in register with the screws 16, whereby the expansion ring 25 is securely retained within its mounting recess.

The expansion ring 25 is fabricated of a material having a predetermined thermal coefficient of expansion greater than that of the transducer casing 10, and the expansion ring is of such outer diameter to provide a predetermined fit with the inner wall surface 13 of the transducer casing so that upon an increase in temperature the thermal expansion of the ring 25 will exert increasing pressure against the inner wall surface 13 and create a desired radial stress which tends to increase the diaphragm tension. A method for the determination of the size and fit of the expansion ring will now be presented, for an example wherein the transducer casing 10 is of a steel alloy commonly known as Ni-Span C and the diaphragm is of a stainless steel alloy commonly known as 17–7. A comparison will be made between expansion rings fabricated of #303 stainless steel and of #2024 aluminum. Various of the known physical properties of these materials are presented in tabular form by the following Table I:

TABLE I

| Ring material | $\alpha c_r$ | E | $\nu$ | $x_n - x_r$ |
|---|---|---|---|---|
| Ni-Span C | 4.5 | 28×10⁶ | .30 | 0 |
| 303 stainless steel | 9.5 | 30×10⁶ | .30 | -5.0 |
| 2024 aluminum | 13.0 | 10.6×10⁶ | .33 | -8.5 |
| 17-7 stainless steel | 5.6 | 29×10⁶ | .30 | -1.1 | where:

$E$ = Young's modulus of expansion ring (p.s.i.)
$\nu$ = Poisson's ratio
$\alpha c_n$ = expansion rate of casing material ($\mu$in./in./° F.)
$\alpha c_r$ = expansion rate of ring material ($\mu$in./in./° F.)

The radial stress, $\delta_r$, developed between the expansion ring and the casing depends on the ring material and the ring-casing system expansion, and is in accordance with the relationship $$\delta_r = \frac{(x_s - x_r)}{1 - 2\nu_r}$$

where $\Delta T$ represents temperature difference in degrees Fahrenheit and $x_s$ represents the expansion rate of the ring-casing system. The graph of FIGURE 4 is plotted from this relationship and depicts, for a given temperature range of 100° F., how the radial compressive stress varies with expansion for #303 stainless steel and #2024 aluminum expansion rings in a Ni-Span C casing of a predetermined stiffness. The stress characteristic line for #303 stainless steel is indicated by the reference numeral 27, the stress characteristic line for #2024 aluminum being indicated by the reference numeral 28. It is apparent that different degrees of temperature compensation can be achieved by selection of the expansion ring material.

Referring now to FIGURES 3 and 5 of the drawing, practical examples of the present invention temperature compensating technique will be given. With specific reference to FIGURE 3, which shows an enlarged view of the expansion ring 25 and adjacent portions of the transducer casing 10, various dimensions are indicated by reference characters. The thickness of the expansion ring is indicated by the reference symbol $t$, the thickness of the annular end surface 11 of the transducer casing being indicated by the reference symbol $h$, and the distance from the center line of the expansion ring to the bottom of the relief groove 23 being indicated by the reference symbol $l$. Four different transducer models were constructed using various materials for the expansion ring and various dimensions, these four models being identified by the reference characters A, B, C, and D are in following Table II.

TABLE II

| Model | Material | t (in.) | h (in.) | l (in.) |
|---|---|---|---|---|
| A | Ni-Span C | 0 | .025 | 0 |
| B | 2024 aluminum | .020 | .025 | .080 |
| C | No. 303 stainless steel | .012 | .025 | .075 |
| D | do | .020 | .030 | .060 |

The transducer casing material in all four of these models was Ni-Span C alloy. The diameter of the expansion ring for each of these four models was 0.700″ and machined for a 0.0005″ interference fit at 78° F. between the ring and the inner wall surface 13 of the transducer casing. The ring was mounted in the casing in liquid nitrogen, at which temperature the fit was quite loose. The graph of FIGURE 5 depicts the output sensitivity in millivolts per p.s.i. for each of the four models, as measured over a temperature range extending from −30° F. to +180° F., each of the plotted characteristics being identified by its respective model reference character designation. The plotted characteristic for model A (constructed in accordance with the prior art configuration of FIGURE 1 using no expansion ring or relief groove) clearly illustrates the undesirable "hot sensitivity" of the prior art embodiment. Model B, using a #2024 aluminum expansion ring exhibits an overcompensated characteristic, while model C using a #303 stainless steel expansion ring exhibits almost constant device sensitivity over the measured temperature range. Model D also uses a #303 stainless steel expansion ring, however, the expansion ring is thicker than that of model C, model D exhibiting a slightly rising sensitivity characteristic with increasing temperature, which may be desirable in certain cases.

The minimum temperature at which the expansion ring fit is tight was determined as follows for the #303 stainless steel expansion ring:

$$.0005 = D(x_n - x_r)\Delta T = .700(4.5 - 9.5)10^{-6}\Delta T$$

$$\text{so } \Delta T = \frac{500 \times 10^{-6}}{.7(-5.0)10^{-6}} = 143°$$

Subtracting 143 degrees from normal room temperature of +78° F. gives a result of −65° F. Hence, the lowest operating temperature for a tight fit, for #303 stainless steel expansion rings, is −65° F. Similarly, using the foregoing method of computation, the lowest operating temperature for a tight fit, for #2024 aluminum expansion rings, is found to be −5° F. In those applications where a lowest operating temperature lower than −5° F. is desired, a tighter interference fit would be required.

Present invention transducer embodiments constructed in accordance with the dimensions and materials of model D have been found ideally suited for use with piezoelectric translating devices employing semiconductor strain gages having a temperature sensitivity characteristic of 20%/100° F. For this application, the slightly rising sensitivity characteristic shown for model D in FIGURE 5 is desirable because electrical shunting can pull this characteristic down, decreasing the slope and resulting in practically perfect overall temperature compensation. Electrical trimming can not be used to increase the slope of the temperature sensitivity characteristic, so the ideal characteristic should not have a negative slope before final compensation.

Using a #303 stainless steel expansion ring and assuming the system expansion rate to be the mean of #303 stainless steel and Ni-Span C alloy, the radial stress will increase at the rate of about −19,000 p.s.i./100° F. from −65° F. At 250° F. this will be −60,000 p.s.i. In accordance with the present disclosure, those skilled in the art will appreciate how to achieve various other temperature compensation characteristics in accordance with changes in dimensions and material selection.

In FIGURE 6 of the drawing there is shown an alternative transducer embodiment of the general type shown in FIGURE 1, with like reference numerals again indicating identical components. In this embodiment an external compression ring 30 encircles the casing 10 adjacent the diaphragm 17. The thermal coefficient of expansion of the ring 30 depends upon the type of construction desired, and can be determined upon the hereinabove presented principles. Again, an interface fit is used to give a desired pre-stressing in view of the contemplated temperature range.

Although the invention has been described with a certain degree of particularity, it is understood that the present disclosure has been made only by way of example and that numerous changes in the details of construction, the selection of material, and the combination and arrangement of parts may be resorted to without departing from the spirit and the scope of the invention as hereinafter claimed.

What is claimed is:

1. In a pressure responsive transducer having a casing defining a tubular portion terminating in a substantially planar open end surface to which a flexible diaphragm is secured in fluid-tight relationship, the improvement comprising a ring fitted to said tubular portion of said casing adjacent said diaphragm, said ring being fabricated of a material having a predetermined thermal coefficient of expansion different than that of said casing so that upon an increase in temperature above room temperature said ring will expand at a rate different than said casing to radially stress the contiguous portion of said casing and said diaphragm in a temperature compensating manner.

2. The improvement in pressure responsive transducers defined in claim 1, wherein said ring is concentrically disposed within the tubular portion of said casing adjacent said diaphragm, and wherein the thermal coefficient of expansion of said ring is greater than that of said casing.

3. The improvement in pressure responsive transducers defined in claim 2, wherein said ring is mounted to said casing with an interference fit at room temperature.

4. The improvement in pressure responsive transducers defined in claim 1, wherein said ring encircles the tubular portion of said casing adjacent said diaphragm, said ring being mounted to said casing with an interference fit at room temperature.

5. The apparatus defined in claim 1, wherein the tubular portion of said casing is fabricated from Ni-Span C alloy, said diaphragm from 17–7 stainless steel alloy, and said ring from 303 stainless steel alloy.

6. The apparatus defined in claim 1, wherein the tubular portion of said casing is fabricated from Ni-Span C alloy, said diaphragm from 17–7 stainless steel alloy, and said ring from 2024 aluminum alloy.

7. The apparatus defined in claim 2, wherein said tubular portion of said casing is fabricated from Ni-Span C alloy, said diaphragm from 17–7 stainless steel alloy, and said ring from the 303 stainless steel alloy.

8. The apparatus defined in claim 2, wherein the tubular portion of said casing is fabricated from Ni-Span C alloy, said diaphragm from 17–7 stainless steel alloy, and said ring from 2024 aluminum alloy.

No references cited.

LOUIS R. PRINCE, *Primary Examiner.*

D. O. WOODIEL, *Assistant Examiner.*